(12) United States Patent
Du et al.

(10) Patent No.: US 12,377,746 B2
(45) Date of Patent: Aug. 5, 2025

(54) LOAD SHEDDING FOR A VEHICLE

(71) Applicant: GM Global Technology Operations LLC, Detroit, MI (US)

(72) Inventors: Xinyu Du, Oakland Township, MI (US); Infane Lowe, Grand Blanc, MI (US); Chandra S. Namuduri, Troy, MI (US); Lyall Kenneth Winger, Waterloo (CA); Jonathan O. Conell, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 17/884,145

(22) Filed: Aug. 9, 2022

(65) Prior Publication Data
US 2024/0051421 A1   Feb. 15, 2024

(51) Int. Cl.
*B60L 53/63*   (2019.01)
*B60L 53/14*   (2019.01)

(52) U.S. Cl.
CPC ............ *B60L 53/63* (2019.02); *B60L 53/14* (2019.02)

(58) Field of Classification Search
CPC .. B60L 53/63; B60L 53/14; B60L 1/00; H02J 7/00; B60R 16/033
See application file for complete search history.

(56) References Cited

U.S. PATENT DOCUMENTS

| | | | |
|---|---|---|---|
| 2010/0145540 A1* | 6/2010 | McKenna | B60L 53/665 700/295 |
| 2013/0197748 A1* | 8/2013 | Whitaker | B60L 53/305 701/1 |
| 2013/0249280 A1* | 9/2013 | Goodermuth | B60L 1/00 307/9.1 |
| 2014/0211345 A1* | 7/2014 | Thompson | H01H 9/548 335/11 |
| 2015/0258948 A1* | 9/2015 | Planas | H02J 1/14 307/10.6 |
| 2016/0089994 A1* | 3/2016 | Keller | B60L 53/14 320/153 |
| 2016/0137089 A1* | 5/2016 | Wu | G01S 5/02521 701/22 |
| 2018/0105052 A1* | 4/2018 | Patil | B60L 53/63 |
| 2020/0017042 A1* | 1/2020 | Boesch | B60L 3/0092 |
| 2020/0086712 A1* | 3/2020 | Schumacher | H02J 1/14 |
| 2020/0381923 A1* | 12/2020 | Chow | H01M 10/4207 |
| 2023/0009818 A1* | 1/2023 | Park | H02J 1/082 |

* cited by examiner

*Primary Examiner* — Wade Miles
*Assistant Examiner* — Mohammed Yousef Abuelhawa
(74) *Attorney, Agent, or Firm* — CANTOR COLBURN LLP (57) ABSTRACT

A method is provided that includes determining whether to perform a load shed operation for a vehicle. The method further includes responsive to determining to perform the load shed operation, issuing a command to a device to perform the load shed operation. The method further includes determining whether the device performed the load shed operation. The method further includes responsive to determining that the device failed to perform the load shed operation, opening a relay associated with the device to prevent power from being delivered to the device.

20 Claims, 7 Drawing Sheets

LOAD SHEDDING FOR A VEHICLE

INTRODUCTION

The present disclosure relates to vehicles and particularly to load shedding for a vehicle.

Modern vehicles (e.g., a car, a motorcycle, a boat, or any other type of automobile) may be equipped with one or more electric motors, such as to drive a wheel(s) of the vehicle. For example, an electric motor can be mechanically coupled to a wheel of a vehicle to apply rotational force to the wheel, creating a driveline. In some examples, a vehicle can include multiple electric motors. The electric motor(s) receives electric power from a rechargeable energy storage system (RESS), which can include one or more batteries for storing electric power. The batteries can be recharged, for example, using a charging station. The RESS can also provide electric power to other systems of the vehicle (e.g., climate control systems, infotainment systems, etc.).

SUMMARY

In one exemplary embodiment, a method is provided. The method includes determining whether to perform a load shed operation for a vehicle. The method further includes responsive to determining to perform the load shed operation, issuing a command to a device to perform the load shed operation. The method further includes determining whether the device performed the load shed operation. The method further includes responsive to determining that the device failed to perform the load shed operation, opening a relay associated with the device to prevent power from being delivered to the device.

In addition to one or more of the features described herein, or as an alternative, further embodiments of the method may include that determining whether to perform the load shed operation is based at least in part on a power availability and an energy availability.

In addition to one or more of the features described herein, or as an alternative, further embodiments of the method may include that determining whether the device performed the load shed operation comprises receiving a feedback signal from the device.

In addition to one or more of the features described herein, or as an alternative, further embodiments of the method may include that determining whether the device performed the load shed operation comprises determining whether a total current power is equal to a threshold percentage of a maximum power.

In addition to one or more of the features described herein, or as an alternative, further embodiments of the method may include that determining whether to perform the load shed operation is based at least in part on a power request and a current power shed level.

In addition to one or more of the features described herein, or as an alternative, further embodiments of the method may include that determining whether to perform the load shed operation is based at least in part on an available energy and an available power.

In addition to one or more of the features described herein, or as an alternative, further embodiments of the method may include that it is determined to perform the load shed operation responsive to the available energy exceeding a threshold and a power request exceeding the available power.

In addition to one or more of the features described herein, or as an alternative, further embodiments of the method may include that the available power is based at least in part on a maximum power and a total power of a current load.

In addition to one or more of the features described herein, or as an alternative, further embodiments of the method may include that the available energy is based at least in part on a maximum energy and a total energy of a current load.

In another exemplary embodiment a system is provided. The system includes a battery, a device creating a load on the battery, and a controller. The controller determines whether to perform a load shed operation for the device. The controller further, responsive to determining to perform the load shed operation, issues a command to the device to perform the load shed operation. The controller further determines whether the device performed the load shed operation. The controller further, responsive to determining that the device failed to perform the load shed operation, open a relay associated with the device to prevent power from being delivered from the battery to the device.

In addition to one or more of the features described herein, or as an alternative, further embodiments of the system may include that determining whether to perform the load shed operation is based at least in part on a power availability and an energy availability.

In addition to one or more of the features described herein, or as an alternative, further embodiments of the system may include that determining whether the device performed the load shed operation comprises receiving a feedback signal from the device.

In addition to one or more of the features described herein, or as an alternative, further embodiments of the system may include that determining whether the device performed the load shed operation comprises determining whether a total current power is equal to a threshold percentage of a maximum power.

In addition to one or more of the features described herein, or as an alternative, further embodiments of the system may include that determining whether to perform the load shed operation is based at least in part on a power request and a current power shed level.

In addition to one or more of the features described herein, or as an alternative, further embodiments of the system may include that determining whether to perform the load shed operation is based at least in part on an available energy and an available power.

In addition to one or more of the features described herein, or as an alternative, further embodiments of the system may include that it is determined to perform the load shed operation responsive to the available energy exceeding a threshold and a power request exceeding the available power.

In addition to one or more of the features described herein, or as an alternative, further embodiments of the system may include that the available power is based at least in part on a maximum power and a total power of a current load.

In addition to one or more of the features described herein, or as an alternative, further embodiments of the system may include that the available energy is based at least in part on a maximum energy and a total energy of a current load.

In yet another exemplary embodiment a system is provided. The system includes a memory comprising computer readable instructions and a processing device for executing the computer readable instructions. The computer readable instructions control the processing device to perform operations. The operations include determining whether to perform a load shed operation for a vehicle. The operations further include responsive to determining to perform the load shed operation, issuing a command to a device to perform the load shed operation. The operations further include determining whether the device performed the load shed operation. The operations further include, responsive to determining that the device failed to perform the load shed operation, opening a relay associated with the device to prevent power from being delivered to the device.

In addition to one or more of the features described herein, or as an alternative, further embodiments of the system may include that determining whether to perform the load shed operation is based at least in part on an available energy and an available power, wherein it is determined to perform the load shed operation responsive to the available energy exceeding a threshold and a power request exceeding the available power, wherein the available power is based at least in part on a maximum power and a total power of a current load, and wherein the available energy is based at least in part on a maximum energy and a total energy of the current load The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments described herein provide for load shedding for a vehicle. Batteries can be used to provide electrical power to systems and devices of a vehicle. Examples of such systems and devices can include climate control systems, infotainment systems, heated seats, heated steering wheels, window defoggers, and/or the like including combinations and/or multiples thereof. During certain times, electrical load may be heavier than others. For example, when many systems and devices operating on electrical power are engaged at the same time, electrical load may be high. In some situations, it may be desirable to shed one or more of the electrical loads to reduce electrical load on the vehicle. Load shedding involves reducing the amount of power consumed by a system or device. For example, power to a device or system can be reduced by a certain percentage of (e.g., 30%, 50%, 80%, 100%, and/or the like). In some examples, reducing the power involves stopping power from flowing to a certain system or device.

Conventional approaches to load shedding are insufficient. For example, conventional approaches to load shedding only consider the battery energy level but not power availability, so these conventional approaches cannot manage the power distribution when the power source (e.g., battery) is degraded and/or failed. Further, conventional approaches to load shedding fail to verify load shedding actions because no feedback path exists.

One or more embodiments described herein address these and other shortcomings by providing architectures and methods for load shedding in a vehicle. Particularly, one or more embodiments described herein, provide architectures and methods that provide load shedding verification using a feedback path. One or more embodiments provide architectures and methods that calculate power availability and energy availability and load shed based on power availability and energy availability. Power availability is how much power is available at a particular time expressed in watts (W). Energy availability is how much power is available over a period of time expressed in amp hours (Ah). Load shedding is useful in vehicles to prolong battery state of charge (SOC) and provide electrical system functionalities.

Figure 1:
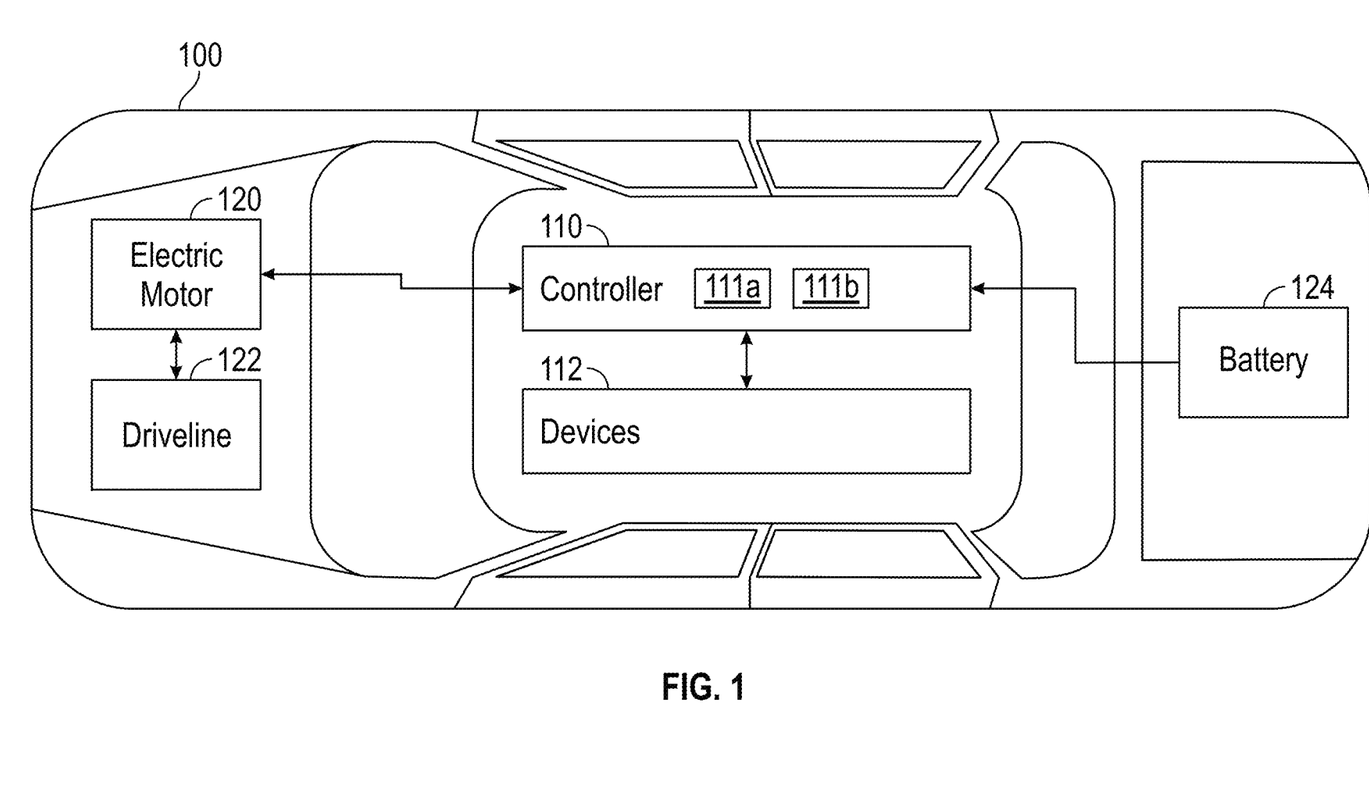
FIG. 1 is a block diagram of a vehicle that includes a controller for performing load shedding according to one or more embodiments described herein.

FIG. 1 is a block diagram of a vehicle 100 that includes a controller 110 for performing load shedding (e.g., a load shed operation) according to one or more embodiments described herein. The controller 110 performs load shedding for one or more devices 112. As used herein, the devices 112 can include devices, systems, and/or the like including combinations and/or multiples thereof. Examples of the devices 112 include climate control systems, infotainment systems, heated seats, heated steering wheels, window defoggers, and/or the like including combinations and/or multiples thereof.

The vehicle 100 further includes an electric motor 120 coupled to a driveline 122. According to one or more embodiments, the controller 110 can control (directly and/or indirectly) aspects of the electric motor 120, such as by providing commands to the electric motor 120 to cause the electric motor 120 to take an action (e.g., increase speed, increase torque, decrease speed, decrease torque, etc.). According to one or more embodiments, the electric motor 120 is controlled by another system or device, such as a traction power inverter module (TPIM). For example, the TPIM controls the electric motor 120 in the vehicle 100, and an auxiliary power module (APM) controls power (e.g., 12 volt power) to other loads in the vehicle.

The vehicle 100 further includes a battery 124. The battery 124 provides electric power to the electric motor 120 and to the devices 112, which can be provided by the controller 110. As an example, the battery 124 includes one or more batteries to receive, store, and supply electric power.

The controller 110 controls load shedding to selectively provide electric power from the battery 124 to the devices 112.

The features and functions of the controller 110 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the features and functions of the controller 110 described herein can be a combination of hardware and programming. According to one or more embodiments described herein, the controller can include a processor 111a (e.g., the processors 721 of FIG. 7, and/or the like including combinations and/or multiples thereof) and a memory 111b (e.g., the random access memory 724 of FIG. 7, the read only memory 722 of FIG. 7, and/or the like including combinations and/or multiples thereof) to store instructions that when executed by the processor 111a cause the processor 111a to perform operations, such as the method 500 of FIG. 5, the method 600 of FIG. 6 and/or the like including combinations and/or multiples thereof Turning now to FIG. 2, a block diagram of the controller 110 of FIG. 1 for performing load shedding according to one or more embodiments described herein is provided. As shown, the controller 110 is connected to the battery 124, system loads 210a, 210b, 210c (collectively "system loads 210"), and an auxiliary power module (APM) or generator 212. The battery 124 provides electric power to the system loads 210. The APM or generator 212 generates electric power and provides it to the battery 124 (such as for charging the battery) and/or to the system loads 210.

Figure 2:
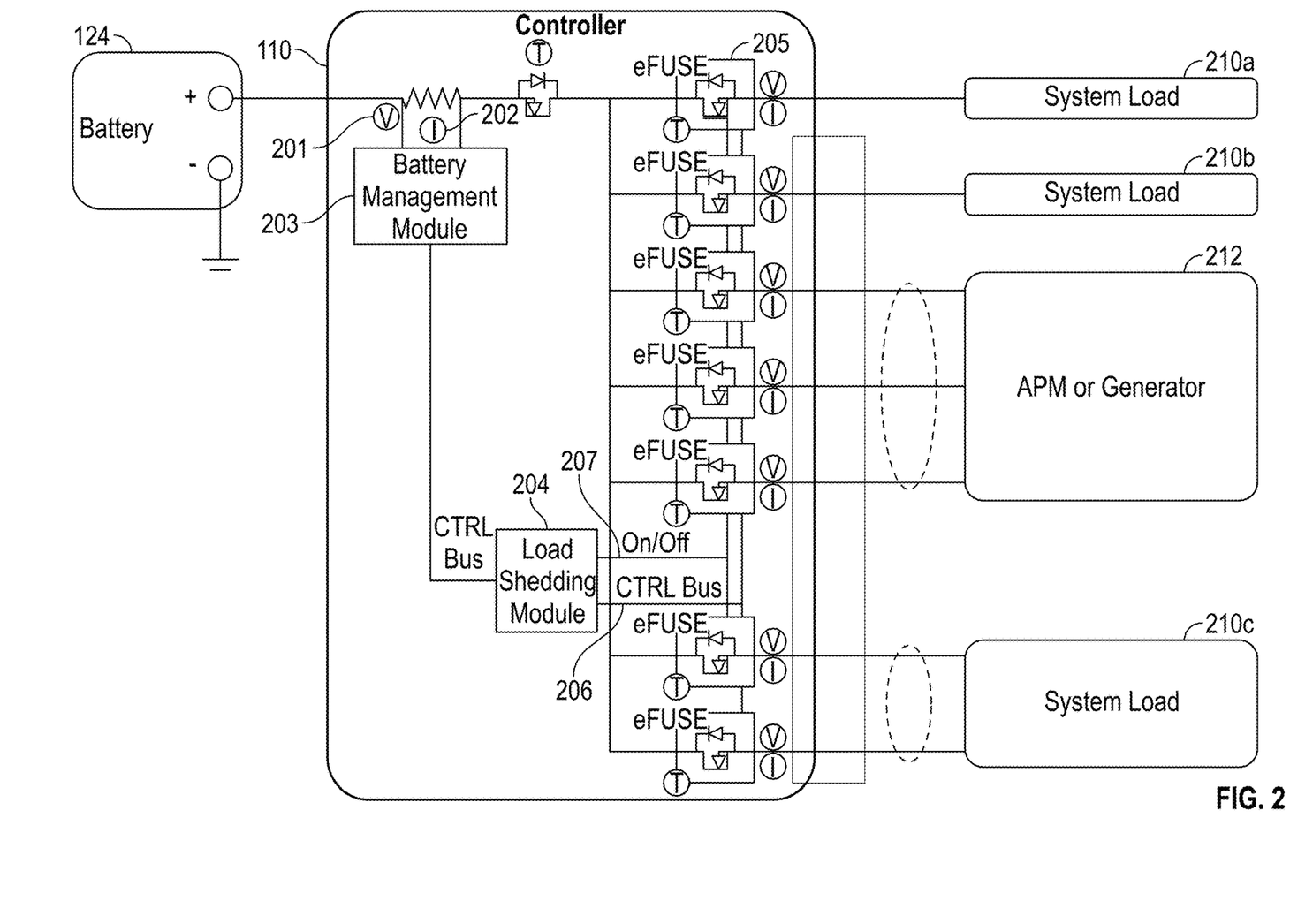
FIG. 2 is a block diagram of the controller of FIG. 1 for performing load shedding according to one or more embodiments described herein.

In the example of FIG. 2, the controller 110 includes a voltage sensor 201, a current sensor 202, a battery management module 203, a load shedding module 204, and relays 205. The voltage sensor 201 and the current sensor 202 measure voltage and current, respectively, coming from or going to the battery 124.

The battery management module 203 performs coulomb counting, which relates to calculating a state of charge, performing cell balancing, determining faults, and/or the like, including combinations and/or multiples thereof.

The load shedding module 204 performs one or more calculations (which may be in real-time or near-real-time) to determine when to apply load shedding according to one or more embodiments described herein. For example, the load shedding module 204 can calculate an available amount of power ($P_{available}$) and/or an available amount of energy ($E_{available}$).

According to one or more embodiments described herein, the available amount of power ($P_{available}$) is calculated using the following equations:

$$P_{max} = P_{batt(soc\%)} + P_{APMorGEN}$$

$$TotalP_{current\_load} = \sum_{k}^{n}(V_{Loadk} * I_{Loadk})$$

-continued $$P_{available} = P_{max} - TotalP_{current}$$

where $P_{max}$ is a maximum amount of power, $P_{batt(soc\ \%)}$ is the power of the battery 124 based on a state of change percentage of the battery 124, $P_{APMorGEN}$ is the power of the APM or generator 212, $TotalP_{current\_load}$ is a current power load, $V_{loadk}$ is the voltage of a particular system load k, and $I_{loadk}$ is the current of a particular system load k.

According to one or more embodiments described herein, the available amount of energy ($E_{available}$) is calculated using the following equations:

$$E_{max} = E_{batt(soc\ \%)} + E_{APMorGEN}$$

$$TotalE_{current\_load} = TotalP_{current} * time$$

$$E_{available} = E_{max} - E_{current}$$

where $E_{max}$ is a maximum amount of energy, $E_{batt(soc\ \%)}$ is the energy of the battery 124 based on a state of change percentage of the battery 124, $E_{APMorGEN}$ is the energy of the APM or generator 212, and $TotalE_{current\_load}$ is a current energy load.

Figure 6:
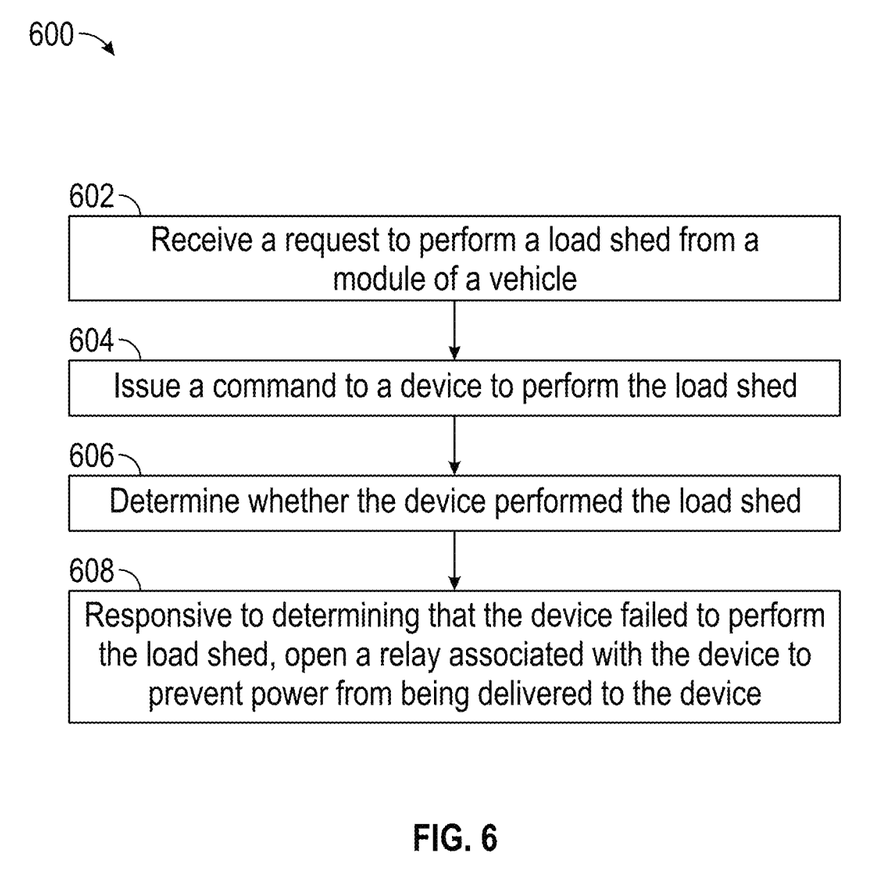
FIG. 6 is a block diagram of a method for load shedding for a vehicle according to one or more embodiments described herein.

The available amount of power and the available amount of energy can be used to determine when to perform a load shed operation (see, e.g., FIG. 6).

Once it is determined to perform a load shed operation, the load shedding module 204 sends a signal/command to a device or system (or multiple devices and/or systems) to perform the load shed operation. For example, the load shedding module 204 sends a signal/command to one or more of the system loads 210a, 210b, 202c to cause the respective load to implement load shedding. The signal/command is sent via a control bus 206 connecting the load shedding module 204 and the system loads 210. According to one or more embodiments described herein, the signal/command is a software-based signal.

In some cases, the load shedding module 204 can implement a hardware-based load shed operation by opening a relay associated with a load to be shed. As shown in FIG. 2, the load shedding module 204 can send a hardware-based signal to one or more of the relays 205 via an on/off bus 207 to cause the respective one or more of the relays 205 to open. This is useful when a system load fails to implement load shedding responsive to the signal/command sent via the control bus 206.

Figure 3:
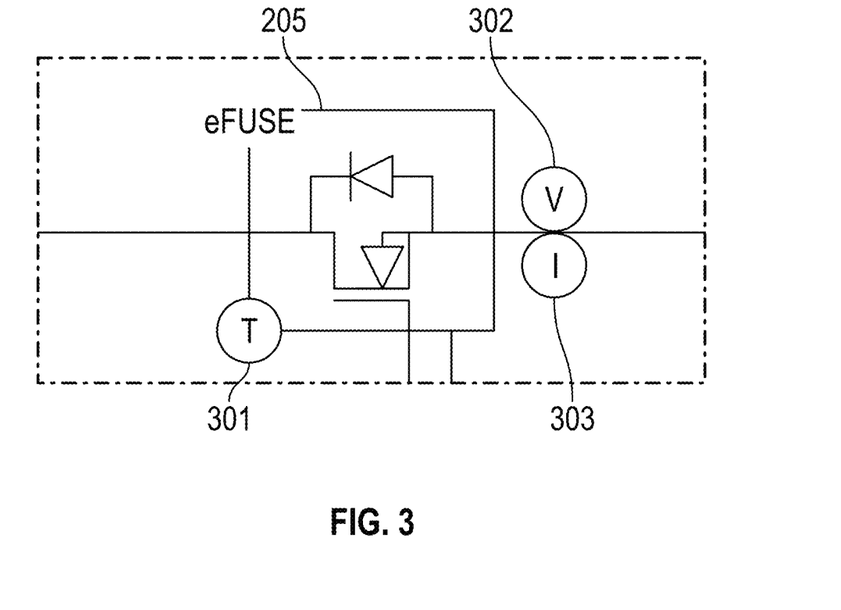
FIG. 3 is a block diagram of the relay of FIG. 2 according to one or more embodiments described herein.

The relay 205 may be a smart metal-oxide-semiconductor field-effect transistor (MOSFET) switch and may include one or more sensors according to one or more embodiments described herein. For example, FIG. 3 is a block diagram of the relay 205 of FIG. 2 according to one or more embodiments described herein. As shown, the relay 205 (e.g., a fuse, a smart fuse, and/or the like, including combinations and/or multiples thereof) includes a temperature sensor 301, a voltage sensor 302, and a current sensor 303. The voltage sensor 302 can be used to determine voltage of a load (e.g., one of the system loads 210); similarly, the current sensor 303 can be used to determine current of the load.

With continued reference to FIGS. 2 and 3, the load shed operation can be one of several different load shed operations, which the controller 110 can select based on operating conditions of the vehicle 100. Table 1 depicts different load shed operations (e.g., load shed levels 1-6) with associated descriptions, triggers, and results.

| Load Shed (LS) Operation | Description | Trigger | Result |
| --- | --- | --- | --- |
| LS Level 0 | APM or generator can deliver required power for system | Load Shed Enabled = true AND Battery Temp Initial = true AND Remote Start = true OR Power Mode = Accessory or Run OR $\Delta$ Emax and Ecurrent > threshold | No load output power reduction or load reduction; 100% power output, zero loads reduced |
| LS Level 1 | APM or generator cannot deliver required power for system | $\Delta$ of APM $P_{max}$ and APM current power > threshold OR $\Delta$ of battery $P_{max}$ and battery current power > threshold OR $\Delta$ Emax and Ecurrent > threshold | Reduce load output power and/or number of loads in system; Up to 80% power output and/or loads reduced via priority list |
| LS Level 2 | APM or generator in degraded state | $\Delta$ of APM $P_{max}$ and APM current power > threshold OR $\Delta$ of battery $P_{max}$ and battery current power > threshold OR $\Delta$ Emax and Ecurrent > threshold | Shed non-safety critical loads to allow substantially 5 minutes of driving; up to 50% power output and/or loads reduced via priority list |
| LS Level 3 | Battery, APM or generator failure | Load reduction timer OR $\Delta$ of APM $P_{max}$ and APM current power > threshold OR $\Delta$ of battery $P_{max}$ and battery current power > threshold OR $\Delta$ Emax and Ecurrent > threshold | Allow substantially 1 minute of driving; up to 0% of power output and/or loads reduced via priority list |
| LS Level 4 | Dual battery and APM or generator failure at the same time | Lost communication with first and second battery OR Battery temperature > 90° or < −10° on first and second battery OR Contactors open for both first and second battery AND Self-test not active $\Delta$ of APM $P_{max}$ and APM current power > threshold OR $\Delta$ of battery $P_{max}$ and battery current power > threshold AND $E_{max}$ calculations | Want components to regulate their consumption and limit transients |
| LS Level 5 | Misbehaving load shut-down | LS Level 4 AND Power consumption of non-safety critical loads > threshold | — |
| LS Level 6 | All systems except key-less entry shed | LS Level 5 AND Relay reset for non-safety critical loads | — |

According to an example as shown in the table, when the vehicle 100 operates in a nominal state, LS level 0 is active. At any time, based on power and energy availability and consumption, the controller 110 can selectively implement any of LS levels 1-3. If power and energy availability and consumption are not satisfied by the LS levels 1-3, the controller can implement LS level 4. If LS level 4 is not effective (e.g., power and/or energy consumption is still too high), the controller 110 can implement LS level 5, which tries to implement the load shedding operation using the relay 205 to prevent the load from receiving power. If the relay approach of LS level 5 is unsuccessful, the controller 110 can implement LS level 6. This provides a graduated approach to load shedding, considering both power and energy considerations as well as feedback from the loads.

Figure 4:
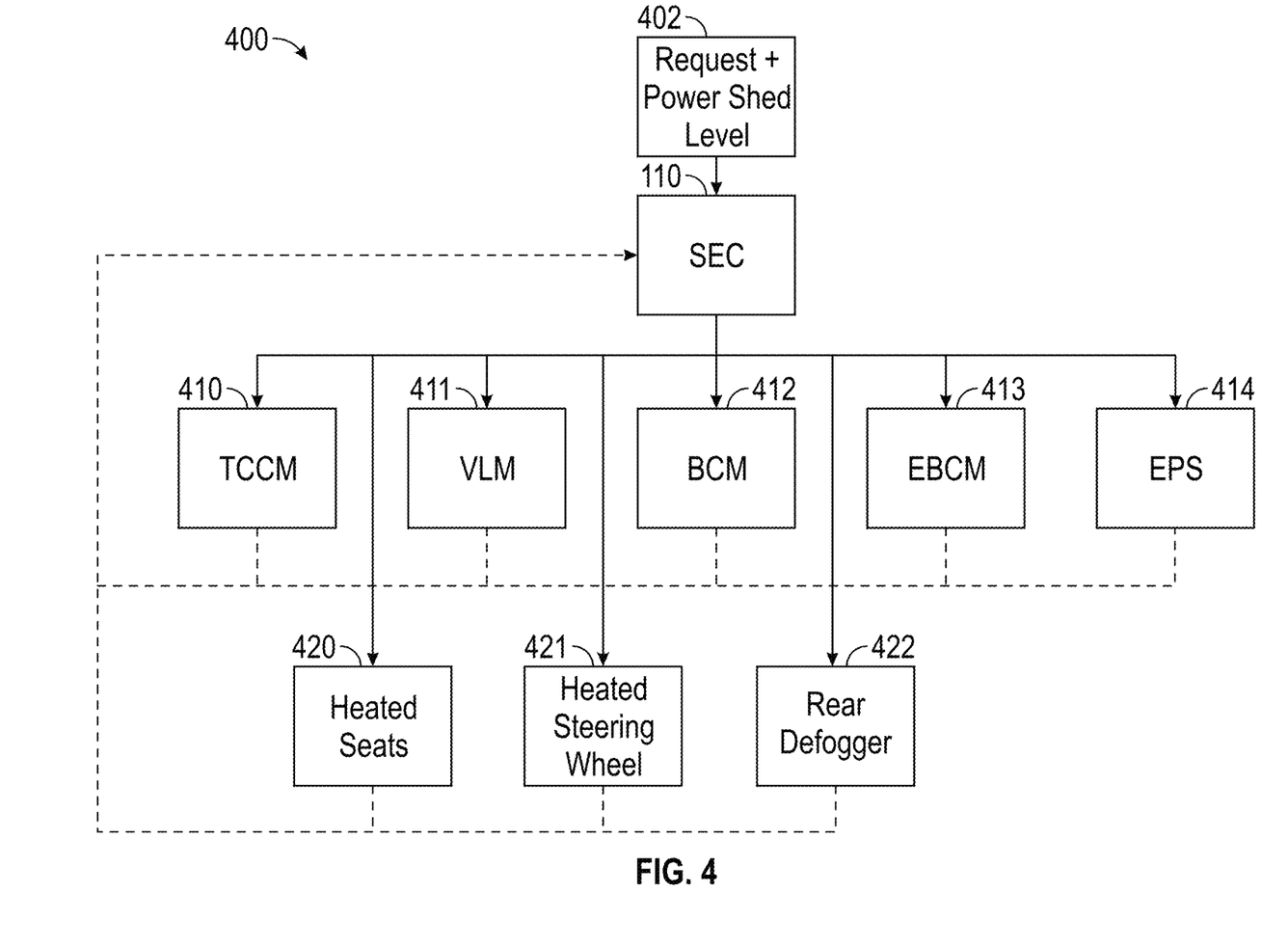
FIG. 4 is a block diagram of a system for load shedding according to one or more embodiments described herein.

FIG. 4 is a block diagram of a system 400 for load shedding according to one or more embodiments described herein. The system 400 can be implemented using the controller 110 the processing system 700 of FIG. 7, or any other suitable processing system and/or processing device (e.g., a processor). At block 402, a power request (e.g., a request from one of the system loads 210 for power) and a current power shed level (see, e.g., Table 1) are fed into the controller 110. The controller 110 determines whether to implement load shedding (see, e.g., FIGS. 5 and 6). If the controller 110 determines to implement load shedding (e.g., to change the load shed level), the controller 110 can provide a signal/command to one or more systems/devices (e.g., one or more of the system loads 210). Examples of the system loads 210 are shown in FIG. 4 and include a transfer case control module 410, a vehicle leveling module 411, a body control module 412, an electronic brake control module 413, an electronic power steering module 414, heated seats 420, heated steering wheel 421, a rear defogger 422, and/or the like, including combinations and/or multiples thereof. The signal/command is sent via the solid arrows from the controller 110 to the respective system(s)/device(s). The controller 110 can receive a feedback signal via the dashed arrows from each of the system(s)/device(s) as shown.

Figure 5:
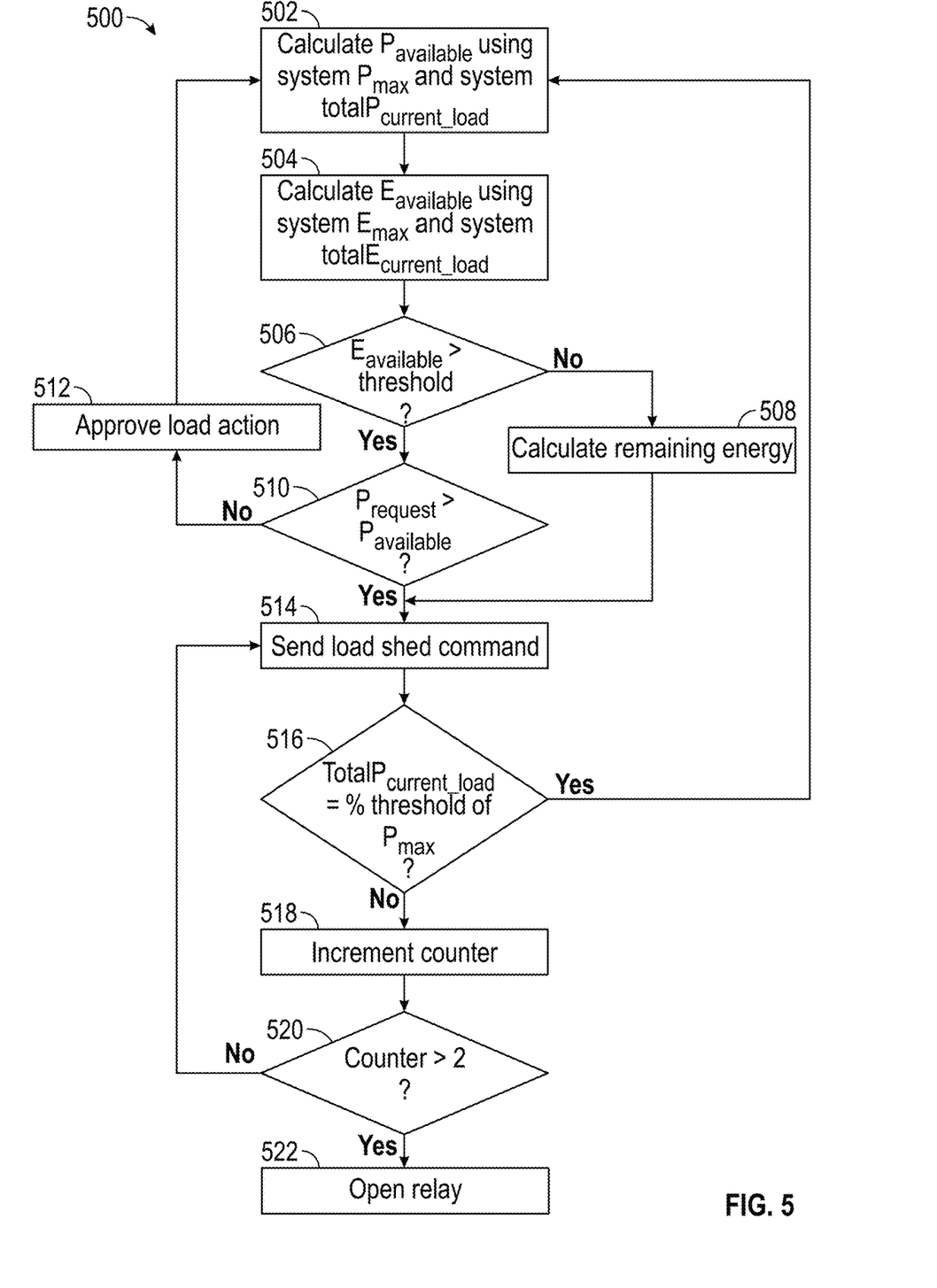
FIG. 5 is a block diagram of a method for load shedding for a vehicle according to one or more embodiments described herein.

FIG. 5 depicts a flow diagram of a method 500 for load shedding for a vehicle according to one or more embodiments described herein. It should be appreciated that the method 500 can be performed by any suitable system or device such as the controller 110 of FIG. 1, the processing system 700 of FIG. 7, or any other suitable processing system and/or processing device (e.g., a processor). The method 500 is now described with reference to one or more aspects of FIGS. 1 and 2A-2C but is not so limited.

At block 502, the method 500 begins and the controller 110 calculates $P_{available}$ using system $P_{max}$ and system $TotalP_{current\_load}$ as described herein. At block 504, the controller 110 calculates $E_{available}$ using system $E_{max}$ and system $TotalE_{current\_load}$ as described herein.

At decision block 506, the controller 110 determines whether $E_{available}$ is not greater than a threshold. If not (decision block 506="N"), the controller 110 calculates a remaining energy at block 508 and the method 500 proceeds to block 514. As an example, the controller 110 calculates the remaining energy as shown in Table 2:

| Time | 1 minute | 5 minutes | 30 minutes | 60 minutes |
| --- | --- | --- | --- | --- |
| Calculated energy available | X Ah | X Ah | X Ah | X Ah |
| Calculated energy lost | X Ah | X Ah | X Ah | X Ah |
| Threshold | 20 Ah | 12 Ah | 4 Ah | 2 Ah |

The values in Table 2 are merely one set of example values. Other sets of example values may be possible in one or more other embodiments.

If, at decision block 506, it is determined that $E_{available}$ is greater than the threshold (decision block 506="Y"), the method 500 proceeds to decision block 510, and the controller 110 determines whether an amount of requested power ($P_{request}$) is greater than the amount of available power ($P_{available}$). If not (decision block 510="N"), the method 500 proceeds to block 512 where the load action is approved (e.g., the request for load can be satisfied by the battery 124 and/or APM or generator 212). The method 500 then returns to block 502 and repeats. If, however, it is determined that $P_{request}$ is greater than $P_{available}$ (decision block 510="Y"), the method 500 proceeds to block 514, and the controller 110 sends a load shed command to one or more of the system loads 210. The load shed command can indicate an amount of power reduction (see, e.g., Table 1), for example.

At decision block 516, the controller 110 determines whether the $TotalP_{current\_load}$ is equal to a percentage threshold of $P_{max}$. If not (decision block 518="N"), a counter is incremented. The counter is initially set to zero, for example. Once incremented at block 518, the controller 110 determines whether the counter is greater than 2 (or some other suitable value). If not (decision block 520="N"), the method 500 returns to block 514, and the blocks 514-520 are repeated until it is determined that the counter is greater than 2 (or some other suitable value). This provides for sending the load shed command to the load(s) multiple times before implementing a hardware-based load shed (e.g., opening a relay). If it is determined that the counter is greater than 2 (or some other suitable value) (decision block 520="Y"), the method 500 proceeds to block 522, and the controller 110 causes a relay associated with the load to be shed to be opened. This may include opening multiple relays if multiple loads are to be shed.

Additional processes also may be included, and it should be understood that the process depicted in FIG. 5 represents an illustration and that other processes may be added or existing processes may be removed, modified, or rearranged without departing from the scope and spirit of the present disclosure.

FIG. 6 depicts a flow diagram of a method 600 for load shedding for a vehicle according to one or more embodiments described herein. It should be appreciated that the method 600 can be performed by any suitable system or device such as the controller 110 of FIG. 1, the processing system 700 of FIG. 7, or any other suitable processing system and/or processing device (e.g., a processor). The method 600 is now described with reference to one or more aspects of FIGS. 1-4 but is not so limited.

At block 602, the controller 110 determines whether to perform a load shed operation for a vehicle (e.g., the vehicle 100). At block 604, responsive to determining to perform the load shed operation, the controller 110 issues a command to a device (e.g., one of the modules 410-414, one of the devices 420-422, and/or the like including combinations and/or multiples thereof) to perform the load shed operation.

At block 606, the controller 110 determines whether the device performed the load shed operation. At block 608, responsive to determining that the device failed to perform the load shed operation, the controller 110 opens a relay (e.g., the relay 205) associated with the device to prevent power from being delivered to the device. Opening the relay can include causing the relay to be opened.

Additional processes also may be included, and it should be understood that the process depicted in FIG. 6 represents an illustration and that other processes may be added or existing processes may be removed, modified, or rearranged without departing from the scope and spirit of the present disclosure.

Figure 7:
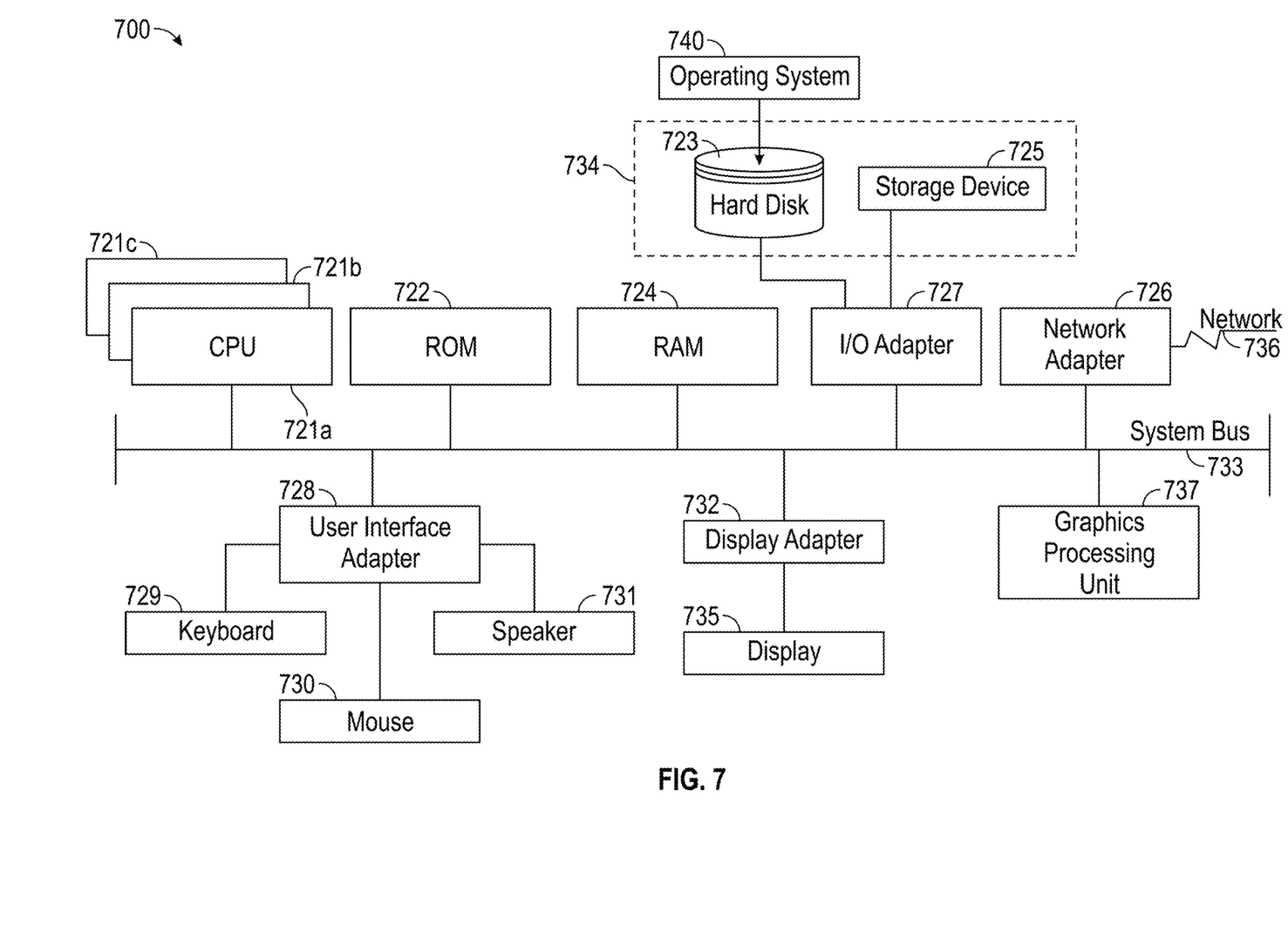
FIG. 7 is a block diagram of a processing system for implementing the techniques described herein according to an exemplary embodiment.

It is understood that one or more embodiments described herein is capable of being implemented in conjunction with any other type of computing environment now known or later developed. For example, FIG. 7 depicts a block diagram of a processing system 700 for implementing the techniques described herein. In examples, processing system 700 has one or more central processing units ("processors" or "processing resources") 721a, 721b, 721c, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of processing system 700.

Further depicted are an input/output (I/O) adapter 727 and a network adapter 726 coupled to system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. A keyboard 729, mouse 730, and speaker 731 may be interconnected to system bus 733 via user interface adapter 728, which may include, for example, a Super I/O chip integrating multiple device adapters into a single integrated circuit.

In some aspects of the present disclosure, processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing, and has a highly parallel structure that makes it more effective than general-purpose CPUs for algorithms where processing of large blocks of data is done in parallel.

Thus, as configured herein, processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in processing system 700.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A method comprising:
   selecting a selected load shed operation from one of three initial load shed operations, wherein the selecting is based at least in part on an operating condition of the vehicle;
   responsive to determining to perform the selected load shed operation, issuing, by the controller, a command to a device to perform the selected load shed operation;
   determining, by the controller, whether the device performed the selected load shed operation based at least in part on an available energy and an available power, wherein the available energy is how much power is available over a period of time expressed in amp hours (Ah), and wherein the available power is how much power is available at a particular time expressed in watts (W);
   responsive to determining that the selected load shed operation was not effective, implementing an additional load shed operation other than the three initial load shed operations; and
   responsive to determining that the device failed to perform the selected load shed operation or that the additional load shed operation was not effective, opening a relay associated with the device to prevent power from being delivered from the battery to the device.

2. The method of claim 1, wherein determining whether the device performed the selected load shed operation comprises receiving a feedback signal from the device.

3. The method of claim 1, wherein determining whether the device performed the selected load shed operation comprises determining whether a total current power is equal to a threshold percentage of a maximum power.

4. The method of claim 1, wherein determining whether to perform the selected load shed operation is based at least in part on a power request and a current power shed level, the current power shed level being based on the operating condition of the vehicle.

5. The method of claim 1, wherein it is determined to perform the selected load shed operation responsive to the available energy exceeding a threshold and a power request exceeding the available power.

6. The method of claim 1, wherein the available power is based at least in part on a maximum power and a total power of a current load.

7. The method of claim 1, wherein the available energy is based at least in part on a maximum energy and a total energy of a current load.

8. A vehicle comprising:
a battery;
a device creating a load on the battery; and
a controller to:
selecting a selected load shed operation from one of three initial load shed operations, wherein the selecting is based at least in part on an operating condition of the vehicle;
responsive to determining to perform the selected load shed operation, issue a command to the device to perform the selected load shed operation;
determine whether the device performed the selected load shed operation;
responsive to determining that the selected load shed operation was not effective, implementing an additional load shed operation other than the three initial load shed operations; and
responsive to determining that the device failed to perform the selected load shed operation or that the additional load shed operation was not effective, open a relay associated with the device to prevent power from being delivered from the battery to the device.

9. The vehicle of claim 8, the controller further to determine whether to perform the selected load shed operation based at least in part on a power availability.

10. The vehicle of claim 8, wherein determining whether the device performed the selected load shed operation comprises receiving a feedback signal from the device.

11. The vehicle of claim 8, wherein determining whether the device performed the selected load shed operation comprises determining whether a total current power is equal to a threshold percentage of a maximum power.

12. The vehicle of claim 8, wherein determining whether to perform the selected load shed operation is based at least in part on a power request and a current power shed level.

13. The vehicle of claim 8, the controller further to determine whether to perform the selected load shed operation based at least in part on an available energy and an available power.

14. The vehicle of claim 13, wherein it is determined to perform the selected load shed operation responsive to the available energy exceeding a threshold and a power request exceeding the available power.

15. The vehicle of claim 13, wherein the available power is based at least in part on a maximum power and a total power of a current load.

16. The vehicle of claim 13, wherein the available energy is based at least in part on a maximum energy and a total energy of a current load.

17. The vehicle of claim 8, wherein determining whether the device performed the selected load shed operation is based at least in part on an available energy and an available power, wherein the available energy is how much power is available over a period of time expressed in amp hours (Ah), and wherein the available power is how much power is available at a particular time expressed in watts (W).

18. A system comprising:
a memory comprising computer readable instructions; and
a processing device for executing the computer readable instructions, the computer readable instructions controlling the processing device to perform operations comprising:
selecting a selected load shed operation from one of three initial load shed operations, wherein the selecting is based at least in part on an operating condition of the vehicle;
responsive to determining to perform the selected load shed operation, issuing a command to a device to perform the selected load shed operation;
determining whether the device performed the selected load shed operation;
responsive to determining that the selected load shed operation was not effective, implementing an additional load shed operation other than the three initial load shed operations; and
responsive to determining that the device failed to perform the selected load shed operation or that the additional load shed operation was not effective, opening a relay associated with the device to prevent power from being delivered to the device.

19. The system of claim 18, wherein determining whether to perform the selected load shed operation is based at least in part on an available energy and an available power, wherein it is determined to perform the selected load shed operation responsive to the available energy exceeding a threshold and a power request exceeding the available power, wherein the available power is based at least in part on a maximum power and a total power of a current load, and wherein the available energy is based at least in part on a maximum energy and a total energy of the current load.

20. The system of claim 18, wherein determining whether the device performed the selected load shed operation is based at least in part on an available energy and an available power, wherein the available energy is how much power is available over a period of time expressed in amp hours (Ah), and wherein the available power is how much power is available at a particular time expressed in watts (W).

* * * * *